July 12, 1960 R. A. WILSON 2,944,963
CONVERSION OF HEAVY OILS TO GASOLINE USING
THE FLUIDIZED CATALYST TECHNIQUE
Filed March 3, 1958 2 Sheets-Sheet 1
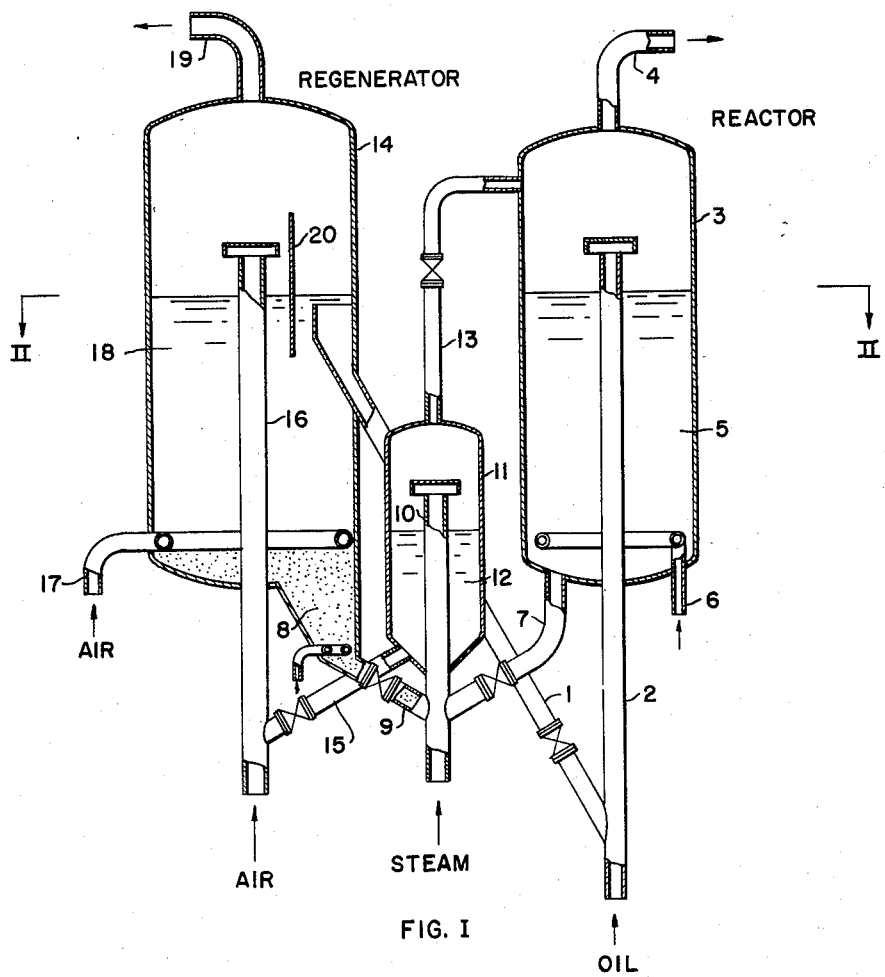
FIG. I
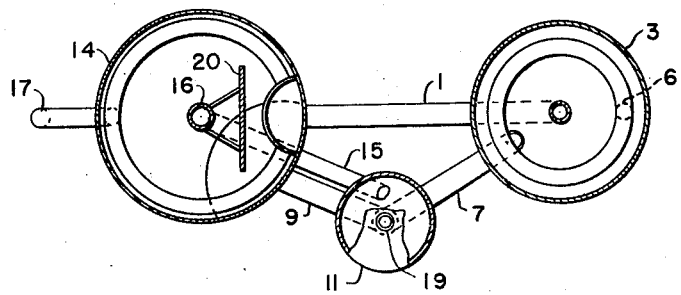
FIG. II
INVENTOR:
RAYMOND A. WILSON
BY: *John H. Colvin*
HIS ATTORNEY

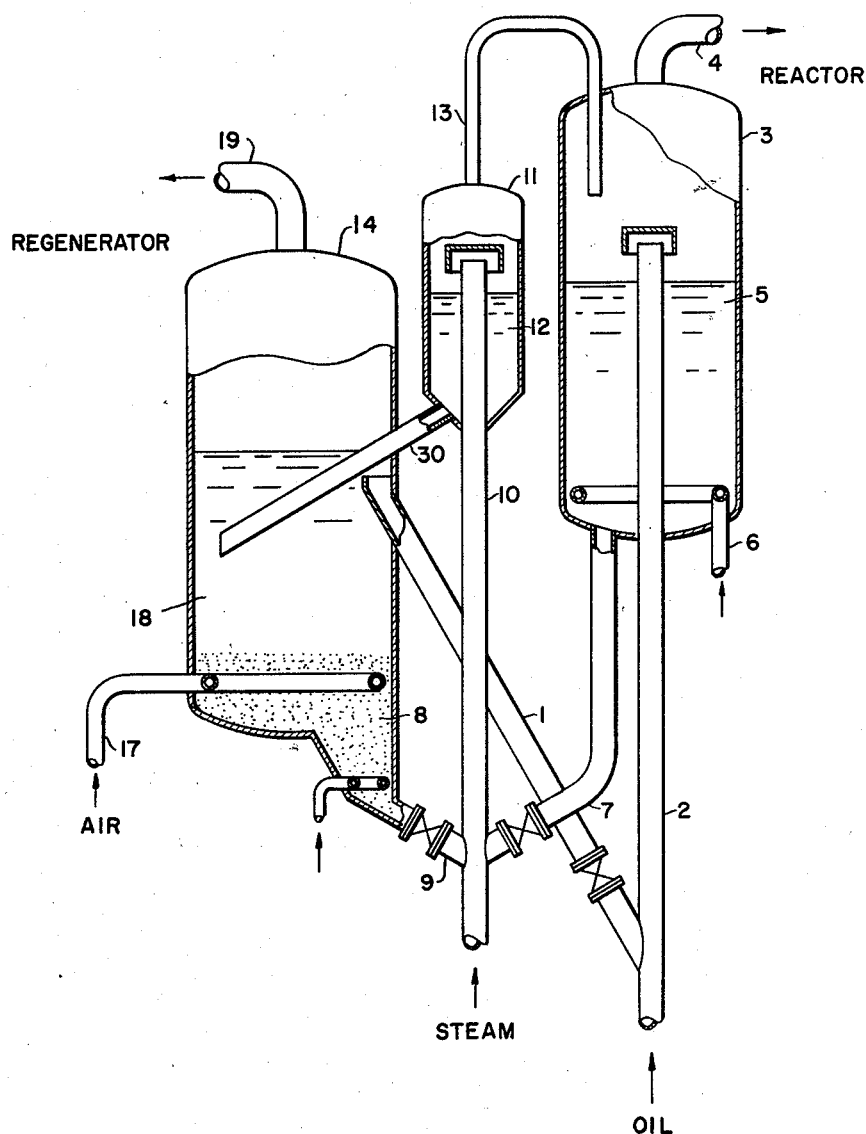
FIG. III

United States Patent Office 2,944,963
Patented July 12, 1960

2,944,963

CONVERSION OF HEAVY OILS TO GASOLINE USING THE FLUIDIZED CATALYST TECHNIQUE

Raymond A. Wilson, Anacortes, Wash., assignor to Shell Oil Company, a corporation of Delaware Filed Mar. 3, 1958, Ser. No. 718,849

3 Claims. (Cl. 208—149)

This invention relates to catalytic cracking of hydrocarbon oils using the fluidized catalyst technique and more particularly to decreasing the amount of compressed air needed for the regeneration of the catalyst through improvement in the method of handling the spent catalyst.

An object of the invention is to provide an improved method of handling the catalyst whereby a large part of the absorbed carbonaceous material in the spent catalyst is removed prior to burning by steaming the spent catalyst while increasing its temperature through the use of the shot technique.

An object of the invention is to provide a means whereby transfer of the shot may be effected economically with special benefit by steam used as a lift gas that simultaneously removes hydrocarbons from the spent catalyst.

The process of the invention relates to catalytic cracking using the fluidized catalyst technique. In such process the hydrocarbon oil to be cracked is passed continuously into contact with a finely divided solid cracking catalyst passing essentially a 100 mesh U.S. standard sieve. The catalyst containing carbonaceous material is continuously removed from the cracking zone at a temperature between about 900° F. and 1000° F. and passed to a separate regeneration zone where the carbonaceous deposits are removed by burning at a temperature between about 1100° F. and 1200° F. in a fluidized bed with air passed up from the bottom of the regeneration zone.

The catalyst used is highly porous having a porosity of at least about 0.25 cc./g. In the process a large amount of catalyst is normally cycled from the reactor to the regenerator, e.g. 2 to 20 pounds of catalyst for every pound of oil charged to the reactor. This large amount of porous catalyst at a temperature usually around 950° F. carries with it a considerable amount of oil within the pores as well as oil vapors between the particles. It is the normal practice to pass the spent catalyst through a zone where steam is passed up through it. The steam removes a portion of occluded oil. The remaining oil is then burned in the regenerator. The burning of this oil consumes a sizable portion of the air that must be compressed and passed through the regenerator. For example, in an average size plant in which the catalyst circulation rate is 20 tons per minute even 1% absorbed oil represents 400 pounds of oil per minute which has to be burned. It is therefore highly important that the amount of such residual oil be reduced as far as practical.

It has been found that the amount of absorbed oil which may be removed from the spent catalyst withdrawn from the reactor depends very much upon the length of time that the absorbed oil contacts the catalyst. Apparently the absorbed material in the catalyst withdrawn from the reactor is undergoing condensation and/or polymerization reactions at a fast rate and these reactions convert the absorbed material to non-volatile compounds which remain in the catalyst. Thus, to effectively remove as much of the hydrocarbon oil as possible it is important that the spent catalyst be treated with steam very quickly with quick separation from the removed material. This can most effectively be done by dispersing the spent catalyst in steam as quickly as possible after its withdrawal and transferring it up through a short straight riser which debouches into a separation chamber. The vapors are withdrawn and the catalyst settles in the chamber as a bed below the top of the riser where, if desired, it may be further treated as a fluidized bed.

Since the vapor effluent from such treatment is passed to the fractionation system connected with the catalytic cracking plant the only practical vapor which can be used is steam and it is desirable to use relatively little steam so as not to complicate and overload the fractionation. Generally, the amount of steam used is between about 4 pounds and 12 pounds per 1,000 pounds of catalyst.

It has also been found that the efficiency with which the absorbed oil can be removed from the spent catalyst is much improved if the treatment is carried out at a higher temperature than that prevailing in the cracking reactor from which the spent catalyst is withdrawn. It is, however, difficult to attain a higher temperature. It is impossible to heat this large stream of catalyst in short enough time by indirect heat exchange. It has been suggested to raise the temperature by adding to the spent catalyst some hot regenerated catalyst from the regenerator. The use of regenerated catalyst or any other porous material, however, largely defeats its purpose since the catalyst is highly porous and the amount of regenerated catalyst that must be used to afford any appreciable increase in temperature is large. For example, if the spent catalyst is at 900° F. and the regenerated catalyst is at 1100° F. the total catalyst flow must be doubled in order to attain a 100° F. temperature rise, i.e. treating temperature of 1000° F. The regenerated catalyst being porous tends to pick up oil removed from the spent catalyst and carry it to the regeneration zone.

A suitable temperature rise can, however, be obtained by using the shot principle. One difficulty here is that in order to utilize the shot principle the shot must be circulated and in the absence of a free lift gas for this particular operation this circulation becomes costly. In the past no practical means of effecting the circulation of the shot were available without going to complicated systems which could not be justified in commercial practice. For instance, the shot could be elevated by transport in air but this is difficult due to the high velocities normally required to transfer the shot in suspension; furthermore this could not be justified unless the same air could be utilized in the regeneration without further compression.

These difficulties are overcome in a simple way and advantages are obtained by operating according to the invention which, as indicated above, is applicable only in a fluidized catalyst catalytic cracking system; thus finely divided solid cracking catalyst passing essentially a 100 mesh U.S. standard sieve is continuously circulated through a catalytic cracking reaction zone; cracking catalyst containing carbonaceous deposits is continuously removed from the cracking zone at between about 900° F. and 1000° F. and passed to a regeneration zone wherein the carbonaceous deposits are removed by burning at a temperature between about 1100° F. and 1200° F. in a fluidized bed with air passed up through the bottom of the regeneration zone. In such system according to one modification of the process (Figs. I and II) and in broad outline there is maintained in only the regeneration zone a lower layer of inert, non-absorbent solid ceramic particles within the range of 60 to about 3.5 mesh and having the properties specified below. A continuous stream of said particles is withdrawn from this lower layer and combined with the withdrawn spent catalyst at the bottom of a vertical open ended riser line debouching into a gas space in a chamber of such diameter that the catalyst and said particles quickly settle to the bottom upon discharge therein. The mixture of catalyst and said particles is transferred up through said riser and into said chamber by steam introduced at the bottom of the riser line. The mixture of catalyst and said particles separated in said chamber is continuously passed to the regeneration zone at such a rate as to maintain the level of settled solids in the chamber below the level of the open end of the riser. Upon entering the regeneration zone the particles settle or sink down through the fluidized bed of catalyst undergoing regeneration and return to the mentioned lower layer.

It will be noted that according to the method of the invention the heating of the spent catalyst is effected in a most advantageous manner. The spent catalyst is heated substantially instantaneously by direct contact with the hot shot and the absobed oil is removed very quickly and without delay while at the same time the shot is transferred by the steam while mixed with the catalyst; under these conditions low and practical steam velocities may be used. No compression cost is involved in handling the shot and the oil removed from the spent catalyst is not diluted with a large volume of fixed gas but only with a small amount of steam which can be condensed and easily separated. The shot being non-absorbent carries practically no oil into the regeneration zone. The advantages and disadvantages of a second modification illustrated in Fig. III will be discussed later.

The principles of the shot technique are known. For example, this technique is suggested for fluid hydroforming by Martin et al., U.S. 2,763,597 and Nicholson, U.S. 2,721,167. However, here the problems are different and different methods of handling are used.

The process of the invention will be described in detail with reference to the accompanying drawings in which:

Figs. I and II are elevational and plan views of a catalytic cracking unit designed to operate according to the method of the invention.

Fig. III is an elevation view of a modified catalytic cracking unit which operates on the same principle but in a different manner.

Referring to Figs. I and II, the oil to be cracked, entering at the lower right, picks up hot freshly regenerated catalyst from inclined standpipe 1 and carries it in suspension up through the riser reactor 2 which provides a straight long narrow reaction zone. The catalyst is sufficiently fine to pass a 100 mesh U.S. standard sieve and consists, for example, of microspheres of silica-alumina cracking catalyst. The temperature in reactor 2 is preferably around 1000° F. and the superficial linear velocity is around 8 to 40 feet per second. The weight ratio of catalyst to oil may be as high as 20 or as low as about 2 but is usually between about 5 and 10. The suspension of catalyst in oil vapors upon being discharged from the riser reactor 2 into the disengaging space in vessel 3 separates; the vapors are withdrawn through cyclone separators (not shown) and line 4 and the catalyst settles into a fluidized bed 5. Additional oil may be introduced near the bottom of vessel 3 by line 6.

The partially spent catalyst now at a temperature of about 900 to 950° F. is continuously withdrawn from the fluid bed 5 via standpipe 7 by gravity flow. Hot shot particles of appreciably higher settling rate than the catalyst are continuously withdrawn from zone 8 in the bottom of the regenerator via line 9. The two withdrawn streams merge at the bottom of a short straight riser line 10 and are picked up and suspended in steam introduced at the bottom of this riser line. The amount of shot thus cycled is controlled by a valve in line 9 and is adjusted to provide a suitable increase in the temperature of the catalyst. The amount may be up to about 1:1 parts by weight with respect to the catalyst whereby a temperature increase of about 100° F. may usually be obtained. In general the amount of shot will be at least about one quarter the amount of the catalyst. The amount of steam required under these conditions is from about 6 to 18 pounds per 1000 pounds of the mixture.

The short riser 10 debouches in the open space within vessel 11. Here again the solid is quickly separated from the vapors and accumulates as a bed 12 in the bottom of the vessel while the vapors are passed by line 13 to the upper part of the reactor 3 to be combined with the main body of cracked oil and passed to the fractionation and recovery systems (not shown).

The bed in vessel 11 consists of a mixture of the shot and catalyst. This mixture is continuously withdrawn from vessel 11 and passed to the regenerator 14. In the particular arrangements shown this mixture is withdrawn by standpipe line 15 to the bottom of the straight narrow vertical riser line 16 where it is picked up by air and transported to the vapor space in the upper part of the regeneration vessel. This arrangement or mode of processing is particularly advantageous since, although most of the absorbed oil has been removed from the spent catalyst with the steam, there still remains some material which at still higher temperatures volatilizes or cracks. The presence of at least about 50% by weight catalyst in the mixture facilitates the transportation of the shot so that only a small portion of the regeneration air is required to effect the transfer in this manner. When using such a small portion of the regeneration air in this way, e.g. 10–25%, the oxygen supplied by the air is very efficiently consumed in burning part of the hydrocarbons and the heat released volatilizes further hydrocarbons which are removed without having to be burned. The total amount of air that is required is therefore reduced. The main portion of the regeneration air is introduced by line 17 and passes relatively slowly up through the bed 18 in the regenerator. The temperature in this bed is between about 1100 and 1200° F.

The mixture discharged from riser 16 into the space above the bed 18 falls into the bed and the regeneration gas containing unburned hydrocarbons released in line 16 are withdrawn through cyclone separators (not shown) and line 19, preferably to a waste heat boiler.

As soon as the mixture of shot and catalyst collects in bed 18 a segregation begins to take place due to the appreciably faster settling velocity in the bed, e.g. 1 to 4 feet per second. The shot falls through the hot catalyst to the bottom of the vessel and collects in the zone 8. Hot regenerated catalyst is withdrawn from the upper part of the bed by standpipe 1. The baffle 20 shields the entrance to this standpipe in such a manner that catalyst settling onto the top of bed 18 has a longer path to travel before reaching the entrance to the standpipe. This affords additional time for the shot to settle.

If the oil introduced by line 6 is unconverted oil (i.e. cycle oil from the fractionation of the product) it will be seen that the described process is a two-stage cracking plus two-stage regeneration process in which the first stage in both cases is effected in a riser line and wherein the catalyst between cracking and regeneration is heated quickly while being given a quick flushing with steam in the every short riser 10.

In Fig. III like parts are numbered the same as in Figs. I and II. This arrangement is similar in principle to that of Figs. I and II but is less advantageous in two ways. It will be noted that the mixture of shot and catalyst, instead of being passed from the vessel 11 to the regenerator by the riser 16 of Fig. I, is passed to the regenerator directly via line 30 by gravity flow. This has the advantage that the discharge of the transfer line may be placed within the catalyst bed in the regenerator at a point below the entrance to the standpipe 1. There is thus less carryover of shot into the reactor. However, the advantage of the preliminary treating of the heated catalyst with part of the air in riser 16 is lost. Also, in order to provide this gravity flow into the regenerator it is necessary to place the vessel 11 at a much higher elevation. This requires also increasing the elevation of the reactor which increases the length of standpipe 7. More time elapses therefore between the time that the spent catalyst enters the standpipe and the time it enters the riser 10. As pointed out above it is desirable to retain this elapsed time at a minimum, e.g. not more than about 5 seconds. Also the riser 10 must be much lengthened and this is also slightly disadvantageous since it creates a greater pressure drop.

The amount of gas passed up through the shot in the lower section of the regenerator is preferably adjusted to afford a superficial gas velocity of at least about 0.25 ft./sec. but insufficient to cause violent agitation in this lower region, i.e. not appreciably above the minimum fluidization velocity. The minimum fluidization velocity depends upon the size and density of the particles and is for example about 0.6 ft./sec. for 35–50 mesh glass particles and about 0.75 ft./sec. for 20–35 mesh glass particles. As the superficial gas velocity in the lower section is reduced from the minimum fluidization velocity or is increased considerably above the minimum fluidization velocity the concentration of catalyst withdrawn with the shot increases and this is undesired. In the region from 0.25 ft./sec. up to around twice the minimum fluidization velocity very little catalyst, e.g. 1–2%, is withdrawn with the shot even at relatively high shot withdrawal rates, e.g. 20,000 lb./ft.²/hr.

The gas introduced into the lower section of the regenerator containing the shot is normally insufficient to provide the desired degree of fluidization in the upper part of the regenerator. For this reason additional gas (air) is introduced by line 17. This air is preferably introduced just above the level of the shot layer.

As pointed out above the shot used is inert, non-absorbent, solid ceramic particles within the range of about 60 to about 3.5 mesh, i.e. retained on a 60 mesh sieve and passing a 3.5 sieve, and has a settling velocity substantially higher than that of the catalyst. The density of the shot particles and/or their size is sufficiently greater than those of the catalyst particles that the shot will readily settle down through the fluidized catalyst in the regenerator and collect as a lower layer. If in any particular system the shot particles are to small their settling rate is too slow. This leads to shot being transferred in part to the reactor and also to catalyst mixing with the shot in the lower layer which is undesired since the catalyst transferred from the regenerator to the steam riser tends to absorb or recapture part of the liberated hydrocarbons. The remedy, if this condition arises, is to increase the size of the shot particles. On the other hand, if the shot particles are too large circulation of the shot becomes difficult; much higher velocities are required and this leads to severe erosion. If this condition arises the remedy is to decrease the size of the shot particles.

The shot should be inert to the hydrocarbon steam and air in the system and should be sufficiently refractory to withstand the prevailing temperatures.

The shot should be non-porous. It should have no pores of small size which tend to absorb hydrocarbon oil or large pores which tend to occlude hydrocarbon. Since the presence of absorbent pores is accompanied by an appreciable surface (as measured, e.g. by the commonly used BET nitrogen adsorption method) the lack of pores may be expressed in terms of surface area. The surface area should not exceed about 1 m.²/g. and is preferably below about 0.1 m.²/g. The shot has been characterized above as ceramic. This is to exclude the various metals and related materials which should not be used because although they may appear inert in bulk as in the shot, produce small amounts of exceedingly finely divided erosion products which are far from inert. On the other hand, the shot need not be made of porcelain but may be made of high melting oxides of various non-ferrous metals such as silicon, aluminum, titanium, zirconium and magnesium and preferably has an appreciable concentration of soda. The shot is preferably in the form of spheres or spheroids. Preferred materials are beads of high melting low soda glass (such as Vicor glass), well rounded silica sand, rounded (e.g. by acid treated) feldspar sand, well rounded rutile, ilmenite, monazite or garnet. Fused alumina spheres (made by blowing molten alumina with a jet of gas are unsuited since such spheres normally have hollow cores and are too buoyant to operate satisfactorily. Such material as corundum (fused alumina granules) are not suited since if they are made by calcining alumina or bauxite particles they still contain a substantial pore volume and if made by crushing fused ingots they are in fact first class abrasives which at the velocities used in the present process quickly cut through even the toughest lining. When made by the former method suitable particles can be prepared if the particles are first saturated with a flux such as from 5 to 10% soda prior to calcining in which case the product is actually no longer corundum but a fused soda-alumina composite having a high apparent density.

It should be noted that the settling rate (which is a kind of opposite to buoyancy) of the shot is a function of the apparent density of the particles and not their absolute or skeletal density. The apparent density is the density of the particles determined by weighing for weight and mercury displacement at substantially atmospheric pressure for volume. The handbook densities sometimes referred to are not generally the apparent densities of commercial products of this nature.

When it is considered that the vapors in the riser during the transport with the relatively small amounts of steam used are largely hydrocarbon vapors it will be appreciated that a relatively dense material will carry a large amount of hydrocarbons into the regeneration zone if it contains even relatively large size pores such as found in pumice or ordinary unglazed porcelain. For this reason a non-porous shot such as described above is important. It is imoprtant not only in preventing carryover of hydrocarbon to the regeneration zone by the substantially increased solids flow rate but also in allowing the smallest size shot for a given settling rate. This is so since the settling rate is proportional to the reciprocal of the square of the particle diameter but only directly proportional to the apparent density.

*Example*

A topped Redwater crude is flashed under vacuum to produce a flashed distillate and the residue is deasphaltized with propane to produce a deasphaltized oil. The flashed distillate and the deasphaltized oil are combined and catalytically cracked with an equilibrium silica-alumina cracking catalyst containing about 25% alumina and about 2% magnesia and having a surface area of about 110 m.²/g. and a porosity of about 0.32 cc. per gram. The cracking is effected in a riser reactor such as the riser 2 in Figure I under the following conditions:

Temperature at bottom _____ ° F__ 1010
Average pressure _____ p.s.i.g__ 14
Liquid hourly space velocity _____ 40
Catalyst to oil ratio _____ 8:1

The conversion to products boiling below 430° F. is about 47% which is slightly above optimum. About 75% of the unconverted oil separated by fractionation of the product is passed through the fluidized catalyst bed 5 at a liquid hourly space velocity of about 1.2 whereby the total conversion of the original feed oil is raised to about 72% and the final catalyst temperature is reduced to about 905° F. The amount of carbonaceous deposits on the spent catalyst is considerably below normal for conventional catalytic cracking operations, e.g. about 9/10 of that for conventional cracking of this feed.

The regeneration is effected with compressed air at a temperature of about 1150° F.

The shot used consists of spheres of non-porous Vicor glass having an average diameter of about 0.9 millimeter. This shot is transferred by gravity flow from the bottom of the regenerator to the bottom of the riser at a rate which is about 0.8 times the catalyst rate whereby the temperature in the riser is raised to about 1005° F. This is a few degrees lower than the calculated temperature due to a small amount of cooling by the steam which is supplied at a rate of about 11 pounds per 1,000 pounds of solid. The solids settled in the chamber 11 are flushed with an additional 2 pounds of steam per 1,000 pounds before passing them to the regenerator by a riser line such as line 16 of Fig. I. About 18% of the total regeneration air is used in this riser line. The solids entering the riser at about 1005° F. are heated during transport to a temperature of about 1045° F.

I hereby claim as my invention:

1. Process for the catalytic cracking of hydrocarbon oils which comprises continuously withdrawing a finely divided cracking catalyst passing essentially a 100 mesh U.S. standard sieve at a temperature between about 1100 and 1200° F. from a first fluidized catalyst bed undergoing regeneration, contacting said catalyst with oil to be cracked at a temperature between about 900 and 1000° F. whereby cracking is effected, collecting the thus used catalyst in a second fluidized bed, withdrawing a stream of catalyst by gravity flow from said second fluidized bed, also withdrawing from the bottom of said first fluidized bed a continuous stream consisting essentially of inert, non-absorbent, solid ceramic particles essentially within the range of about 60 to 3.5 mesh at a temperature between about 1100 and 1200° F. and having a settling velocity substantially higher than said catalyst, mixing the said stream of catalyst within 5 seconds of its withdrawal with said stream of particles in a narrow riser zone, transporting the resulting mixture with steam up through said narrow riser zone to a disengaging zone, collecting the mixture of solids as a fluidized bed in said disengaging zone, and continuously passing the said collected solids from said disengaging zone to said first fluidized bed undergoing regeneration whereby the said particles of inert solids sink to the bottom of said fluidized bed and are recycled only between said first fluidized bed and said disengaging zone.

2. Process according to claim 1 wherein the contacting of said oil with said catalyst is effected while transporting the catalyst in suspension in the oil vapors in a riser.

3. Process according to claim 1 wherein the passage of said collected solids from said disengaging zone to said first fluidized bed is effected by passing the solids suspended in a minor part of the required regeneration air up through a riser into a disengaging space above said first fluidized bed.

References Cited in the file of this patent

UNITED STATES PATENTS

| | | |
|---|---|---|
| 2,400,176 | Thiele | May 14, 1946 |
| 2,446,247 | Scheineman | Aug. 3, 1948 |
| 2,451,619 | Hengstebeck et al. | Oct. 19, 1948 |
| 2,725,341 | Gornowski et al. | Nov. 29, 1955 |
| 2,763,597 | Martin et al. | Sept. 18, 1956 |